(12) United States Patent
Yamazaki et al.

(10) Patent No.: US 11,092,776 B2
(45) Date of Patent: Aug. 17, 2021

(54) IMAGING LENS

(71) Applicant: KANTATSU CO., LTD., Tochigi (JP)

(72) Inventors: Kaoru Yamazaki, Sukagawa (JP); Shingo Yuza, Sukagawa (JP)

(73) Assignee: KANTATSU CO., LTD., Tochigi (JP)

( * ) Notice: Subject to any disclaimer, the term of this patent is extended or adjusted under 35 U.S.C. 154(b) by 24 days.

(21) Appl. No.: 15/948,588

(22) Filed: Apr. 9, 2018

(65) Prior Publication Data

US 2019/0086637 A1    Mar. 21, 2019

(30) Foreign Application Priority Data

Apr. 10, 2017    (JP) .............................. JP2017-077319

(51) Int. Cl.
*G02B 9/60* (2006.01)
*G02B 27/00* (2006.01)
*G02B 13/06* (2006.01)

(52) U.S. Cl.
CPC ............... *G02B 9/60* (2013.01); *G02B 13/06* (2013.01); *G02B 27/0025* (2013.01)

(58) Field of Classification Search
CPC ....... G02B 13/06; G02B 27/0025; G02B 9/60
See application file for complete search history.

(56) References Cited

U.S. PATENT DOCUMENTS

| 6,154,322 A | 11/2000 | Nakayama |
| 2011/0169912 A1 | 7/2011 | Abe et al. |
| 2011/0316969 A1 | 12/2011 | Hsieh et al. |
| 2014/0092489 A1* | 4/2014 | Yamakawa ........ G02B 13/0045 359/714 |
| 2015/0077862 A1* | 3/2015 | Lin ........................ G02B 13/18 359/714 |
| 2015/0131171 A1 | 5/2015 | Harada |
| 2016/0377833 A1 | 12/2016 | Liu et al. |
| 2016/0377835 A1 | 12/2016 | Liu et al. |
| 2017/0010446 A1 | 1/2017 | Liu et al. |

(Continued)

FOREIGN PATENT DOCUMENTS

| CN | 102338923 A | 2/2012 |
| JP | H10-020189 A | 1/1998 |
| JP | H11-305125 A | 11/1999 |

(Continued)

*Primary Examiner* — Joseph P Martinez
*Assistant Examiner* — Vipin Patel
(74) *Attorney, Agent, or Firm* — Hamre, Schumann, Mueller & Larson, P.C.

(57) ABSTRACT

There is provided an imaging lens with high-resolution which realizes the wide field of view, low-profileness, and low F-value in well balance, and proper correction of aberrations.

An imaging lens comprising in order from an object side to an image side, a first lens having a convex surface facing the object side near an optical axis and negative refractive power, a second lens having negative refractive power, a third lens, a fourth lens having biconvex shape near the optical axis, and a fifth lens, wherein each lens of the first lens to the fifth lens is arranged without being cemented, and a below conditional expression (1) is satisfied:

$$0.50 < r5/r6 < 12.50 \qquad (1)$$

where
r5: curvature radius of the object-side surface of the third lens, and
r6: curvature radius of the image-side surface of the third lens.

16 Claims, 16 Drawing Sheets

(56) References Cited

U.S. PATENT DOCUMENTS

2017/0146774 A1 5/2017 Hsu et al.
2017/0261724 A1 9/2017 Lai et al.

FOREIGN PATENT DOCUMENTS

| JP | 2009-031762 A | 2/2009 |
| JP | 2009-136386 A | 6/2009 |
| JP | 2009-216956 A | 9/2009 |
| JP | 2010-078930 A | 4/2010 |
| TW | I583990 B | 5/2017 |
| WO | 2014/017031 A1 | 1/2014 |

* cited by examiner ated by reference.
IMAGING LENS

The present application is based on and claims priority of Japanese patent applications No. 2017-077319 filed on Apr. 10, 2017, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device, and more particularly to an imaging lens which is built in an imaging device mounted in an increasingly compact and high-performance smartphone and mobile phone, and a monitoring camera and an automobile.

Description of the Related Art

In recent years, it becomes common that camera function is mounted in much information equipment. Furthermore, an image sensor of the imaging device such as the monitoring camera and an on-vehicle camera becomes increasingly compact and large in pixel year after year, and the imaging lens is also required to be compact and to have high performance accordingly.

Demand of wide field of view such as a field of view of 180 degrees or more is increased for the imaging lens used for the monitoring camera and the on-vehicle camera. Furthermore, the brighter imaging lens is demanded in accordance with pixel enhancement. However, it is difficult that the conventional lens system realizes an imaging lens which is inexpensive and compact, at the same time, and has a wide field of view satisfying the demand in recent years and high optical performance.

When the wide field of view is achieved using a lens configuration described in Patent Document 1 (JP2009-31762A), aberration correction in a peripheral area is very difficult and proper optical performance can not be obtained.

When low F-number is achieved using a lens configuration described in Patent Document 2 (JP2009-216956A), the aberration correction in a peripheral area is very difficult and proper optical performance can not be obtained.

The present invention has been made in view of the above problems, and an object of the present invention is to provide an imaging lens with high resolution which is applicable to the above mobile terminal devices, a monitoring camera and an on-vehicle camera, satisfies in well balance demand of a wide field of view, low-profileness and the low F-number and properly corrects aberrations.

Regarding terms used in the present invention, a convex surface or a concave surface of lens surfaces implies that a shape of the lens surface near an optical axis (paraxial portion), refractive power implies the refractive power near the optical axis. The pole point implies an off-axial point on an aspheric surface at which a tangential plane intersects the optical axis perpendicularly. The total track length is defined as a distance along the optical axis from an object-side surface of an optical element located closest to the object side to an imaging plane, when thickness of an optical element not involved in divergence or convergence of light, such as an IR cut filter or cover glass is regarded as an air.

An imaging lens according to the present invention which forms an image of an object on a solid-state image sensor comprises in order from an object side to an image side, a first lens having a convex surface facing the object side near the optical axis and negative refractive power, a second lens having negative refractive power, a third lens, a fourth lens having biconvex shape near the optical axis, and a fifth lens, wherein each lens from the first lens to the fifth lens is arranged without being cemented, and a below conditional expression (1) is satisfied:

$$0.50 < r5/r6 < 12.50 \tag{1}$$

where
r5: curvature radius of the object-side surface of the third lens, and
r6: curvature radius of the image-side surface of the third lens.

According to the imaging lens having the above configuration, the first lens has the convex surface facing the object side near the optical axis and the negative refractive power, therefore wide field of view of an optical system is achieved. Furthermore, pencil of rays after emitted from the first lens can be thin and a diameter can be reduced. The second lens has the negative refractive power, therefore suppresses an angle of ray entering the third lens to be small and properly corrects aberration balance of a center and a peripheral area. The third lens maintains low-profileness and corrects axial chromatic aberration, chromatic aberration of magnification, distortion and astigmatism. The fourth lens has biconvex shape near the optical axis, therefore the low-profileness is achieved and the astigmatism and field curvature are properly corrected. The fifth lens corrects the axial chromatic aberration, the distortion, the astigmatism and the field curvature.

The conditional expression (1) defines relationship of the curvature radii of the object-side surface and the image-side surface of the third lens, and is a condition for achieving the low-profileness and proper correction of the aberrations. By satisfying the conditional expression (1), the refractive power of the third lens becomes appropriate and correction of the chromatic aberration, the distortion and the astigmatism is facilitated. In addition, the low-profileness is also achieved.

According to the imaging lens having the above configuration, it is preferable that a below conditional expression (2) is satisfied:

$$-35.50 < f2/f < -2.75 \tag{2}$$

where
f2: focal length of the second lens, and
f: focal length of the overall optical system.

The conditional expression (2) defines a scope of focal length of the second lens to the focal length of the overall optical system of the imaging lens and is a condition for achieving the low-profileness, the wide field of view and proper correction of the aberrations. When value is below the upper limit of the conditional expression (2), the negative refractive power of the second lens becomes appropriate, and the distortion occurred at the second lens can be suppressed to be small. In addition, the low-profileness is achieved. On the other hand, when the value is above the lower limit of the conditional expression (2), the wide field of view is achieved.

According to the imaging lens having the above configuration, it is preferable that a below conditional expression (3) is satisfied:

$$-9.00 < f1/k < -2.20 \tag{3}$$

where
f1: focal length of the first lens, and
f: focal length of the overall optical system.

The conditional expression (3) defines a scope of focal length of the first lens to the focal length of the overall optical system of the imaging lens, and is a condition for achieving the low-profileness and the wide field of view. When value is below the upper limit of the conditional expression (3), the negative refractive power of the first lens becomes appropriate, and the low-profileness is achieved. On the other hand, when the value is above the lower limit of the conditional expression (3), the wide field of view is achieved.

According to the imaging lens having the above configuration, it is preferable that a below conditional expression (4) is satisfied:

$$3.00 < r1/r2 < 6.10 \quad (4)$$

where
r1: curvature radius of the object-side surface of the first lens, and
r2: curvature radius of the image-side surface of the first lens.

The conditional expression (4) defines relationship of the curvature radii of the object-side surface and the image-side surface of the first lens, and is a condition for achieving the wide field of view and proper correction of the aberrations. When value is below the upper limit of the conditional expression (4), the negative refractive power of the first lens becomes appropriate, and correction of the spherical aberration is facilitated. On the other hand, when the value is above the lower limit of the conditional expression (4), the wide field of view is achieved.

According to the imaging lens having the above configuration, it is preferable that composite focal length of the first lens and the second lens is negative. Furthermore, it is more preferable that a below conditional expression (5) is satisfied:

$$-3.20 < f12/f < -1.25 \quad (5)$$

where
f12: composite focal length of the first lens and the second lens, and
f: focal length of the overall optical system.

The conditional expression (5) defines a scope of the composite focal length of the first lens and the second lens to the focal length of the overall optical system of the imaging lens, and is a condition for achieving the low-profileness and the proper aberration correction. When a value is below the upper limit of the conditional expression (5), negative composite refractive power of the first lens and the second lens becomes appropriate, and correction of high-order spherical aberration is facilitated. In addition, the low-profileness is also achieved. On the other hand, when the value is above the lower limit of the conditional expression (5), the wide field of view is achieved.

According to the imaging lens having the above configuration, it is preferable that a below conditional expression (6) is satisfied:

$$-3.90 < r7/r8 < -0.95 \quad (6)$$

where
r7: curvature radius of the object-side surface of the fourth lens, and
r8: curvature radius of the image-side surface of the fourth lens.

The conditional expression (6) defines relationship of the curvature radii of the object-side surface and the image-side surface of the fourth lens, and is a condition for achieving the low-profileness, the wide field of view and proper correction of the aberrations. When a value is below the upper limit of the conditional expression (6), the focal length of the fourth lens is prevented from being excessively large, and the low-profileness is achieved, and the wide field of view is maintained. On the other hand, when the value is above the lower limit of the conditional expression (6), the focal length of the fourth lens is prevented from being excessively small, and it is facilitated to suppress the spherical aberration to be small.

According to the imaging lens having the above configuration, it is preferable that a below conditional expression (7) is satisfied:

$$1.00 \leq f4/f < 2.85 \quad (7)$$

where
f4: focal length of the fourth lens, and
f: focal length of the overall optical system.

The conditional expression (7) defines a scope of focal length of the fourth lens to the focal length of the overall optical system of the imaging lens, and is a condition for achieving the low-profileness, the wide field of view and the proper correction of the aberrations. When value is below the upper limit of the conditional expression (7), the positive refractive power of the fourth lens becomes appropriate, and the low-profileness is achieved, and the wide field of view is maintained. On the other hand, when the value is above the lower limit of the conditional expression (7), it is facilitated to suppress the high-order spherical aberration and the coma aberration to be small.

According to the imaging lens having the above configuration, it is preferable that a below conditional expression (8) is satisfied:

$$-3.50 < (r9+r10)/(r9-r10) < 13.85 \quad (8)$$

where
r9: curvature radius of the object-side surface of the fifth lens, and
r10: curvature radius of the image-side surface of the fifth lens.

The conditional expression (8) is a condition for appropriately defining a shape of the fifth lens. By satisfying the conditional expression (8), the low-profileness is facilitated while securing back focus, and it is also facilitated to suppress the distortion, the chromatic aberration, the astigmatism and the field curvature to be small.

According to the imaging lens having the above structure, it is preferable that a below conditional expression (9) is satisfied:

$$28.00 < vd4 - vd5 < 56.00 \quad (9)$$

where
vd4: abbe number at d-ray of the fourth lens, and
vd5: abbe number at d-ray of the fifth lens.

The conditional expression (9) defines the abbe numbers at d-ray of the fourth lens and the fifth lens, and is a condition for properly correcting the chromatic aberration.

According to the imaging lens having the above structure, it is preferable that a below conditional expression (10) is satisfied:

$$Fno \leq 2.4 \quad (10)$$

where
Fno: F-number

The conditional expression (10) defines F-number of the imaging lens. When value is below the upper limit of the conditional expression (10), brightness demanded for the imaging lens in recent years can be sufficiently secured when the imaging lens is mounted in the portable mobile device, a digital camera, the monitoring camera and the on-vehicle camera.

According to the imaging lens having the above structure, it is preferable that the fifth lens has positive or negative refractive power.

If the negative refractive power is applied to the fifth lens, the chromatic aberration is suppressed and the back focus is secured.

If the positive refractive power is applied to the fifth lens, the low-profileness can be achieved more easily.

When the positive refractive power is applied to the fifth lens, the object-side surface of the fifth lens is preferably formed as the concave surface near the optical axis.

Thus the object-side surface of the fifth lens is formed as concave near the optical axis, it is facilitated to suppress the astigmatism and the field curvature to be small.

Effect of Invention

According to the present invention, there can be provided an imaging lens having wide field of view, low-profileness, low F-number and high resolution which is applicable for the mobile terminal device, a monitoring camera and an on-vehicle camera.

DETAILED DESCRIPTION OF THE PREFERRED EMBODIMENT

Hereinafter, the preferred embodiment of the present invention will be described in detail referring to the accompanying drawings.

FIGS. 1, 3, 5, 7, 9, 11, 13 and 15 are schematic views showing the general configurations of the imaging lenses in Examples 1 to 8 according to the embodiments of the present invention, respectively.

Figure 1:
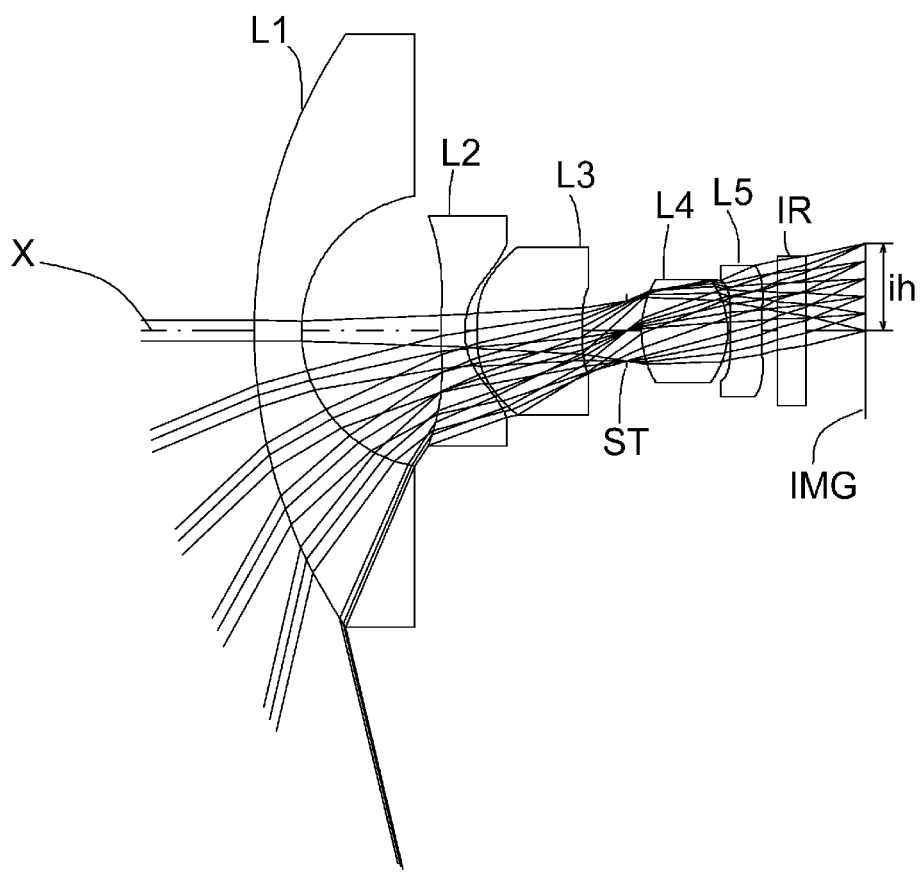
FIG. 1 is a schematic view showing a general configuration of an imaging lens in Example 1 according to the present invention.

As shown in FIG. 1, an imaging lens according to this embodiment comprises in order from an object side to an image side, a first lens L1 having a convex surface facing the object side near the optical axis X and negative refractive power, a second lens L2 having negative refractive power, a third lens L3, a fourth lens L4 having biconvex shape near the optical axis X, and a fifth lens L5. An aperture stop ST is arranged between the third lens L3 and the fourth lens L4.

A filter IR such as an IR cut filter and a cover glass is located between the fifth lens L5 and an image plane IMG (namely, the image plane of the image sensor). The filter IR is omissible.

The refractive power of the fifth lens L5 may be positive or negative. In each Example, regarding the surface shape, for example, from the object side of the second lens L2 to the image side of the third lens L3, and the object side and the image side of the fifth lens L5, various options are available and the convex surface or the concave surface near the optical axis may be selected. Each Example is made by an optimal combination for achieving desirable performance.

More specifically, refractive power arrangement in the Examples 1 to 4, and in Examples 6 to 8 are, in order from the object side, −−++−, the refractive power arrangement in the Examples 5 is, in order from the object side, −−+++. Features of the refractive power arrangement common to all of the Examples are that the first lens L1 and the second lens L2 have the negative refractive power, the third lens L3 and the fourth lens L4 have the positive refractive power. Configuration of the lens surfaces common to all of the Examples is that the first lens L1 is a meniscus lens having the object-side surface which is convex near the optical axis X, the second lens L2 and the third lens L3 are meniscus lenses near the optical axis X, and the fourth lens L4 having biconvex shape near the optical axis X.

Next, the preferred embodiment of the present invention will be described in detail referring to FIG. 1. In the embodiment, the first lens L1 is a meniscus lens having the object-side surface which is convex near the optical axis and the negative refractive power, therefore the wide field of view is achieved.

When the imaging lenses according to the present embodiments is used for such as the on-vehicle camera or the monitoring camera, the first lens L1 arranged closest to the object preferably uses materials having quality excellent in water resistance, weather resistance, acid resistance and chemical resistance. When the glass material is selected, the above condition can be satisfied. Therefore, as the material of the first lens L1, the glass material is more preferable than resin. In this case, if the first lens L1 is spherical lens, it can be made in lower cost than the aspherical lens. The first lens L1 as shown in FIG. 1 is a glass lens having spherical surfaces both on the object side and the image side. The first lens L1 may use the resin material or aspheric surface in accordance with an environment and performance to be used.

The second lens L2 is a meniscus lens having a concave surface facing the image side near the optical axis X, and the negative refractive power. The shape of the second lens L2 may have meniscus shape having a convex surface facing the image side near the optical axis X in an Example 8 shown in FIG. 15.

The third lens L3 is a meniscus lens having a convex object-side surface near the optical axis X and the positive refractive power. The shape of the third lens L3 may have meniscus shape having convex surface facing the image side near the optical axis X in Examples 2, 3, 6, 7 and 8 shown in FIGS. 3, 5, 11, 13 and 15, respectively. Each Example adopts the third lens L3 having the positive refractive power, however the third lens L3 having the negative refractive power may be used.

The fourth lens L4 has a biconvex shape near the optical axis X, and achieves low-profileness by applying strong positive refractive power.

The fifth lens L5 is a double-aspherical meniscus lens having a concave surface facing the image side near the optical axis X and the negative refractive power. As mentioned above, the refractive power of the fifth lens L5 may be positive or negative. When the negative refractive power is selected for the fifth lens L5, the shape of the fifth lens may be either meniscus shape having the concave object-side surface near the optical axis X in Examples 2, 3, 6, 7 and 8 shown in FIGS. 3, 5, 11, 13 and 15 or biconcave shape near the optical axis X in Example 4 shown in FIG. 7. On the other hand, when the positive refractive power is selected for the fifth lens L5, as described in Example 5 shown in FIG. 9, the fifth lens preferably have a meniscus shape having the concave object-side surface near the optical axis X.

An aperture stop ST is arranged between the third lens L3 and the fourth lens L4. The aperture stop ST may be arranged between the second lens L2 and the third lens L3 in Example 8 shown in FIG. 15. When the aperture stop ST is arranged between the second lens L2 and the third lens L3, or between the third lens L3 and the fourth lens L4, it can be achieved to reduce the size in radial direction.

According to the imaging lens according to the present embodiments, for example as shown in FIG. 1, all lenses of the first lens L1 to the fifth lens L5 are preferably single lenses which are not cemented each other. The configuration not including the cemented lens may frequently use the aspheric surfaces and proper correction of the aberration is achieved. Furthermore, manufacturing step related to cement process can be reduced and manufacturing can be made at a low cost.

The imaging lens according to the present embodiments shows preferable effect by satisfying the below conditional expressions (1) to (10).

$$0.50 < r5/r6 < 12.50 \tag{1}$$

$$-35.50 \leq f2/f < -2.75 \tag{2}$$

$$-9.00 \leq f1/k < -2.20 \tag{3}$$

$$3.00 < r1/r2 < 6.10 \tag{4}$$

$$-3.20 \leq f12/k < -1.25 \tag{5}$$

$$-3.90 < r7/r8 < -0.95 \tag{6}$$

$$1.00 < f4/f < 2.85 \tag{7}$$

$$-3.50 < (r9+r10)/(r9-r10) < 13.85 \tag{8}$$

$$28.00 < vd4 - vd5 < 56.00 \tag{9}$$

$$Fno \leq 2.4 \tag{10}$$

where
f: focal length of the overall optical system,
f1: focal length of the first lens L1,
f2: focal length of the second lens L2,
f4: focal length of the fourth lens L3,
f12: composite focal length of the first lens L1 and the second lens L2,
vd4: abbe number at d-ray of the fourth lens L4,
vd5: abbe number at d-ray of the fifth lens L5,
Fno: F-number,
r1: curvature radius of the object-side surface of the first lens L1,
r2: curvature radius of the image-side surface of the first lens L1,
r5: curvature radius of the object-side surface of the third lens L3,
r6: curvature radius of the image-side surface of the third lens L3,
r7: curvature radius of the object-side surface of the fourth lens L4,
r8: curvature radius of the image-side surface of the fourth lens L4,
r9: curvature radius of the object-side surface of the fifth lens L5, and
r10: curvature radius of the image-side surface of the fifth lens L5.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (9a).

$$0.57 < r5/r6 < 12.00 \tag{1a}$$

$$-32.68 < f2/f < -3.07 \tag{2a}$$

$$-8.3141/f < -2.49 \tag{3a}$$

$$3.44 < r1/r2 < 5.53 \tag{4a}$$

$$-2.96 < f12/f < -1.39 \tag{5a}$$

$$-3.66 < r7/r8 < -1.07 \tag{6a}$$

$$1.13 < f4/f < 2.60 \tag{7a}$$

$$-3.24 < (r9+r10)/(r9-r10) < 12.68 \tag{8a}$$

$$31.59 < vd4 - vd5 < 51.32 \tag{9a}$$

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height perpendicular to the optical axis, R denotes a curvature radius, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, examples of the imaging lens according to this embodiment will be explained. In each example, f denotes the focal length of the overall optical system of the imaging lens, Fno denotes an F-number, ω denotes a half field of view, ih denotes a maximum image height. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

| Example 1 |
|---|
| Unit mm | f = 0.91
Fno = 2.0
ω(°) = 103.3
ih = 1.85
TTL = 12.78

Surface Data

| Surface Number i | Curvature Radius r | Surface Distance d | Refractive Index Nd | Abbe Number | vd |
|---|---|---|---|---|---|
| (Object) | Infinity | Infinity | | | |
| 1 | Infinity | Infinity | | | |
| 2 | 11.0833 | 1.0000 | 1.743 | 49.22 | (vd1) |
| 3 | 2.8975 | 2.9725 | | | |
| 4* | 28.0000 | 0.5000 | 1.544 | 55.86 | (vd2) |
| 5* | 1.8000 | 0.2580 | | | |
| 6* | 5.9370 | 2.2340 | 1.661 | 20.37 | (vd3) |
| 7* | 9.3708 | 0.9405 | | | |
| 8(Stop) | Infinity | 0.3216 | | | |
| 9 | 2.1474 | 1.8256 | 1.593 | 67.00 | (vd4) |
| 10 | −1.8107 | 0.0500 | | | |
| 11* | 35.7629 | 0.6778 | 1.661 | 20.37 | (vd5) |
| 12* | 15.3840 | 0.3339 | | | |
| 13 | Infinity | 0.6100 | 1.517 | 64.17 | |
| 14 | Infinity | 1.2597 | | | |
| Image Plane | Infinity | | | | |

Constituent Lens Data

| Lens | Start Surface | Focal Length | | Composite Focal Length |
|---|---|---|---|---|
| 1 | 2 | −5.568 | f12 | −1.620 |
| 2 | 4 | −3.558 | f23 | −3.953 |
| 3 | 6 | 19.479 | f34 | 2.352 |
| 4 | 9 | 1.999 | f45 | 2.027 |
| 5 | 11 | −41.407 | | |

Aspheric Surface Data

| | Fourth Surface | Fifth Surface | Sixth Surface | Seventh Surface | Eleventh Surface | Twelfth Surface |
|---|---|---|---|---|---|---|
| k | 0.000000E+00 | −8.296859E+00 | 0.000000E+00 | 0.000000E+00 | 0.000000E+00 | 0.000000E+00 |
| A4 | −1.252007E−03 | 2.245371E−01 | 1.090518E−01 | 1.068062E−01 | −3.073312E−02 | 1.514929E−02 |
| A6 | −1.750921E−02 | −9.348062E−02 | 4.251684E−03 | 6.573617E−04 | −1.547005E−01 | −5.967331E−02 |
| A8 | 7.968623E−03 | 1.135399E−02 | −1.501351E−02 | 2.197422E−02 | 1.419180E−01 | 2.155799E−02 |
| A10 | −1.641113E−03 | 0.000000E+00 | 2.756414E−03 | 0.000000E+00 | −9.514866E−02 | −8.351687E−03 |
| A12 | 1.647444E−04 | 0.000000E+00 | −2.000000E−16 | 0.000000E+00 | 0.000000E+00 | 1.537473E−03 |
| A14 | −6.491633E−06 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

The imaging lens in Example 1 satisfies conditional expressions (1) to (10) as shown in Table 9.

Figure 2:
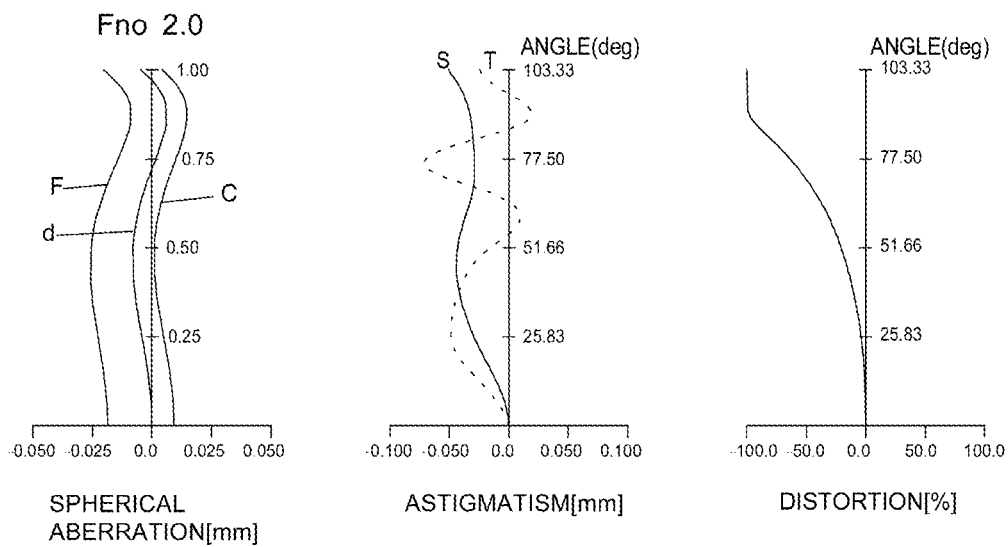
FIG. 2 shows spherical aberration, astigmatism, and distortion of the imaging lens in Example 1 according to the present invention.
Figure 3:
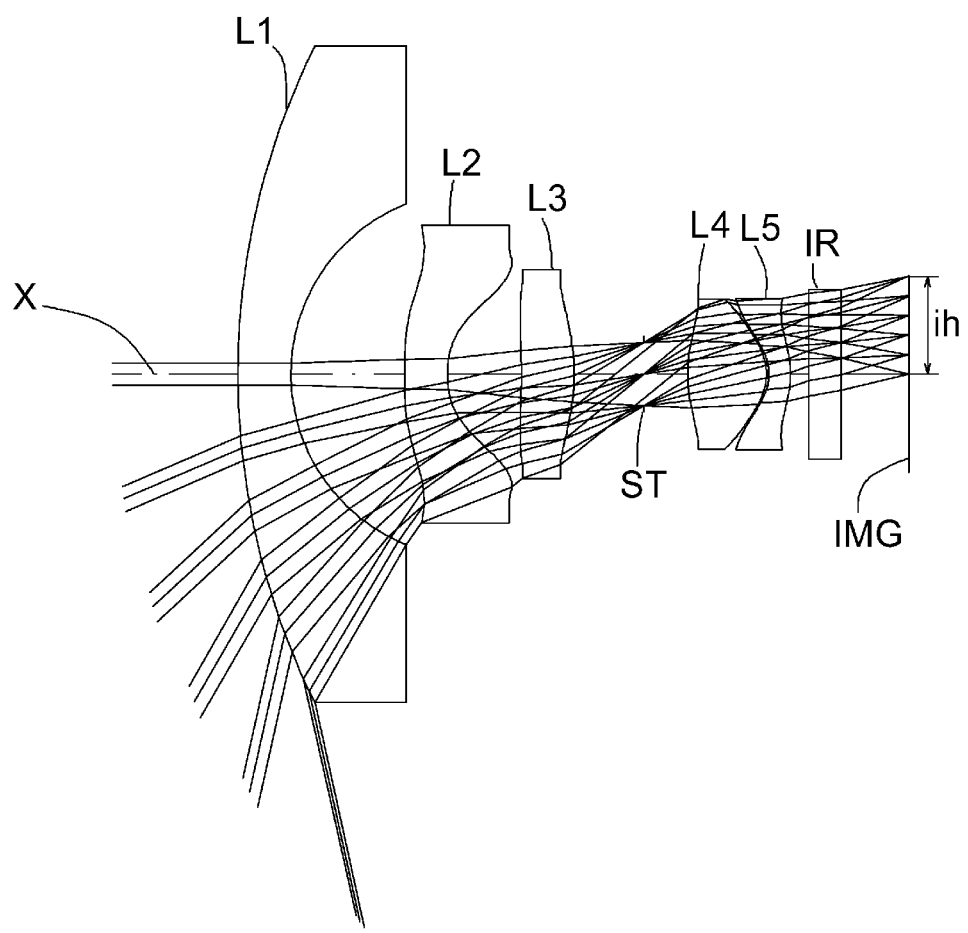
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S and on tangential image surface T, respectively (same as FIGS. 4, 6, 8, 10, 12, 14 and 16). As shown in FIG. 2, each aberration is corrected excellently.

Example 2

The basic lens data is shown below in Table 2.

TABLE 2

Example2

Unit mm $f = 0.87$
$Fno = 2.0$
$\omega(°) = 102.5$
$ih = 1.85$
$TTL = 12.45$

Surface Data

| Surface Number i | Curvature Radius r | Surface Distance d | Refractive Index Nd | Abbe Number | vd |
|---|---|---|---|---|---|
| (Object) | Infinity | Infinity | | | |
| 1 | Infinity | Infinity | | | |
| 2 | 14.0329 | 1.0000 | 1.743 | 49.22 | (vd1) |
| 3 | 3.4793 | 2.1460 | | | |
| 4* | 18.1956 | 0.8037 | 1.544 | 55.86 | (vd2) |
| 5* | 1.8000 | 1.4041 | | | |
| 6* | −9.1490 | 0.9987 | 1.661 | 20.37 | (vd3) |
| 7* | −3.3700 | 1.3063 | | | |
| 8(Stop) | Infinity | 0.8339 | | | |
| 9* | 3.0577 | 1.4887 | 1.697 | 55.46 | (vd4) |
| 10* | −0.9678 | 0.0500 | | | |
| 11* | −0.7909 | 0.4000 | 1.661 | 20.37 | (vd5) |
| 12* | −1.7736 | 0.3491 | | | |
| 13 | Infinity | 0.6100 | 1.517 | 64.17 | |
| 14 | Infinity | 1.2680 | | | |
| Image Plane | Infinity | | | | |

Constituent Lens Data

| Lens | Start Surface | Focal Length | | Composite Focal Length |
|---|---|---|---|---|
| 1 | 2 | −6.486 | f12 | −1.899 |
| 2 | 4 | −3.735 | f23 | −17.817 |
| 3 | 6 | 7.555 | f34 | 1.516 |
| 4 | 9 | 1.244 | f45 | 2.288 |
| 5 | 11 | −2.578 | | |

Aspheric Surface Data

| | Fourth Surface | Fifth Surface | Sixth Surface | Seventh Surface | Ninth Surface | Tenth Surface |
|---|---|---|---|---|---|---|
| k | 0.000000E+00 | −6.400111E+00 | 0.000000E+00 | 0.000000E+00 | 0.000000E+00 | −7.616447E−01 |
| A4 | 4.794071E−02 | 1.936259E−01 | 2.651053E−02 | 3.293261E−02 | 5.650915E−03 | 1.282899E−01 |
| A6 | −1.239915E−02 | −5.540075E−02 | −1.975522E−04 | −7.244497E−03 | −3.347736E−02 | 4.667500E−04 |
| A8 | 1.121893E−03 | 4.173892E−03 | −6.715170E−04 | 1.389994E−03 | 1.671009E−02 | −1.137488E−02 |
| A10 | −3.727015E−05 | 0.000000E+00 | 0.000000E+00 | 0.000000E+00 | −8.543310E−03 | 3.729226E−03 |
| A12 | 0.000000E+00 | 0.000000E+00 | 0.000000E+00 | 0.000000E+00 | 0.000000E+00 | −4.077999E−04 |
| A14 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

| | Eleventh Surface | Twelfth Surface |
|---|---|---|
| k | −9.426743E−01 | 0.000000E+00 |
| A4 | 2.620588E−01 | 1.657169E−01 |
| A6 | −7.448148E−02 | −4.543016E−02 |
| A8 | 2.384125E−02 | 3.375630E−02 |
| A10 | −4.135210E−03 | −1.219801E−02 |
| A12 | 0.000000E+00 | 1.537473E−03 |
| A14 | 0.000000E+00 | 0.000000E+00 |
| A16 | 0.000000E+00 | 0.000000E+00 |

The imaging lens in Example 2 satisfies conditional expressions (1) to (10) as shown in Table 9.

Figure 4:
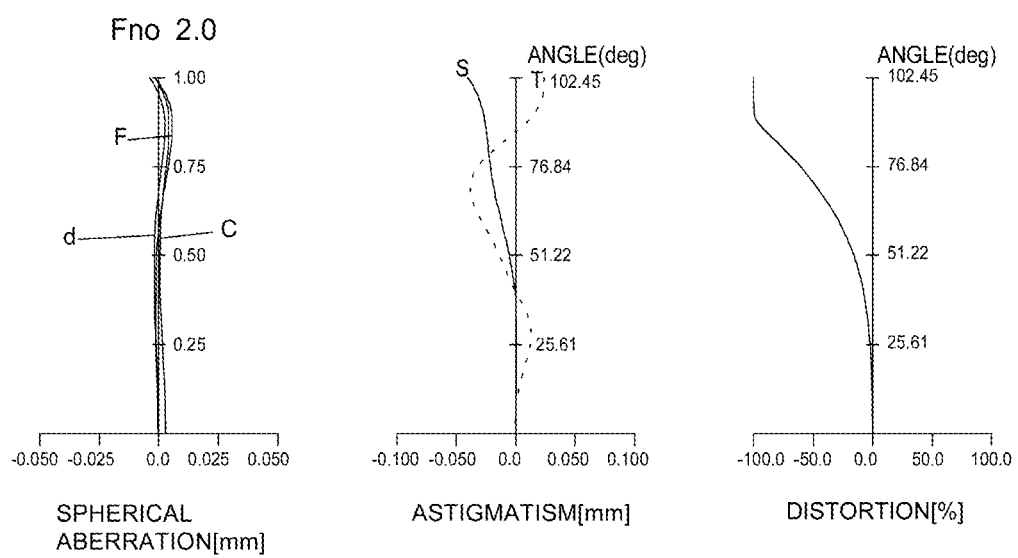
FIG. 4 shows spherical aberration, astigmatism, and distortion of the imaging lens in Example 2 according to the present invention.
Figure 5:
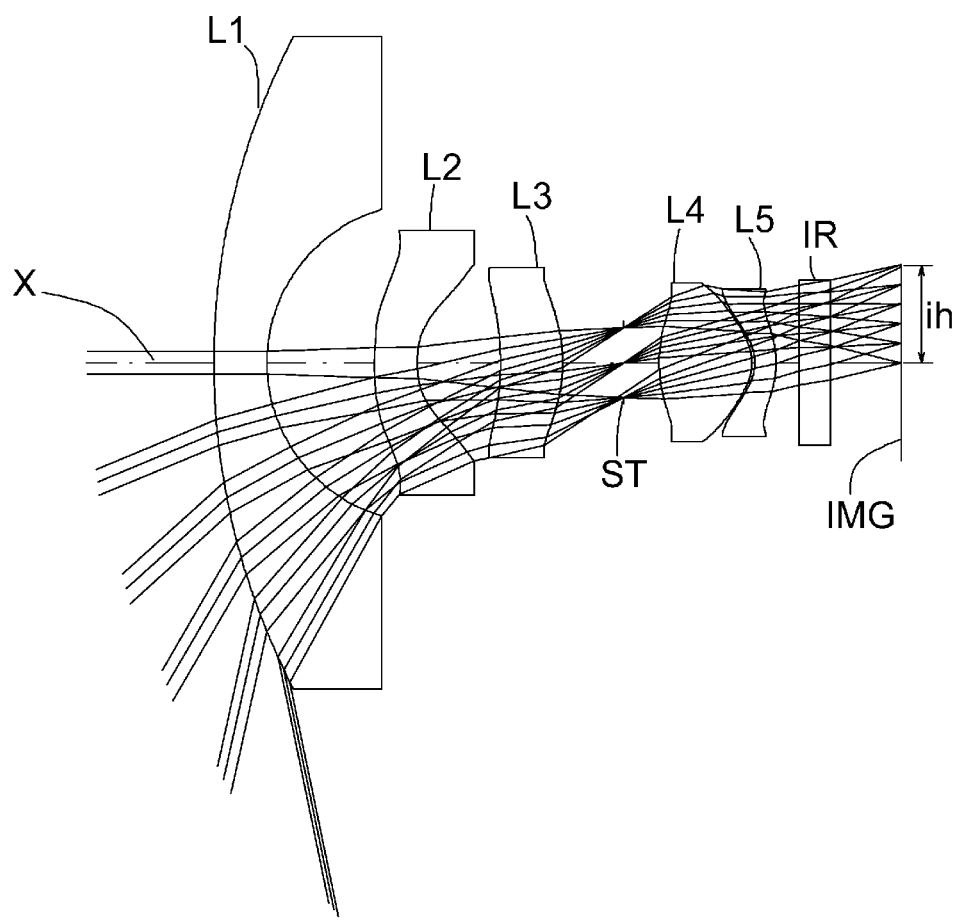
FIG. 5 is a schematic view showing the general configuration of an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

| Example3 |
|---|
| Unit mm |
| f = 0.90<br>Fno = 2.0<br>ω(°) = 101.7<br>ih = 1.85<br>TTL = 12.77 |

Surface Data

| Surface Number i | Curvature Radius r | Surface Distance d | Refractive Index Nd | Abbe Number vd | |
|---|---|---|---|---|---|
| (Object) | Infinity | Infinity | | | |
| 1 | Infinity | Infinity | | | |
| 2 | 13.4355 | 1.0000 | 1.713 | 53.94 | ( vd1) |
| 3 | 3.0257 | 2.0351 | | | |
| 4* | 10.0188 | 0.8000 | 1.544 | 55.86 | ( vd2) |
| 5* | 1.8000 | 1.5802 | | | |
| 6* | −4.7203 | 1.1711 | 1.661 | 20.37 | ( vd3) |
| 7* | −2.8265 | 1.1482 | | | |
| 8(Stop) | Infinity | 0.6739 | | | |
| 9* | 2.6992 | 1.7510 | 1.592 | 67.02 | ( vd4) |
| 10* | −0.8801 | 0.0581 | | | |
| 11* | −0.7609 | 0.4000 | 1.661 | 20.37 | ( vd5) |
| 12* | −1.5915 | 0.4215 | | | |
| 13 | Infinity | 0.6100 | 1.517 | 64.17 | |
| 14 | Infinity | 1.3318 | | | |
| Image Plane | Infinity | | | | |

Constituent Lens Data

| Lens | Start Surface | Focal Length | | Composite Focal Length |
|---|---|---|---|---|
| 1 | 2 | −5.705 | f12 | −1.922 |
| 2 | 4 | −4.174 | f23 | −23.668 |
| 3 | 6 | 8.557 | f34 | 1.478 |
| 4 | 9 | 1.370 | f45 | 2.536 |
| 5 | 11 | −2.730 | | |

Aspheric Surface Data

| | Fourth Surface | Fifth Surface | Sixth Surface | Seventh Surface | Ninth Surface | Tenth Surface |
|---|---|---|---|---|---|---|
| k | 0.000000E+00 | −8817586E+00 | 0.000000E+00 | 0.000000E+00 | 0.000000E+00 | −8.822740E−01 |
| A4 | 6.078313E−02 | 2.612876E−01 | 7.295287E−03 | 1.545673E−02 | 3.478454E−03 | 1.940165E−01 |
| A6 | −1.661815E−02 | −1.063137E−01 | −4.721058E−03 | −1.884594E−03 | −1.055488E−02 | −5.201799E−02 |
| A8 | 1.508555E−03 | 1.324323E−02 | 2.119033E−03 | 1.578334E−03 | −2.592242E−03 | −2.932299E−03 |
| A10 | −4.963726E−05 | 0.000000E+00 | 0.000000E+00 | 0.000000E+00 | 2.611047E−04 | 5.995504E−03 |
| A12 | 0.000000E+00 | 0.000000E+00 | 0.000000E+00 | 0.000000E+00 | −1.950766E−03 | −1.526991E−03 |
| A14 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

| | Eleventh Surface | Twelfth Surface |
|---|---|---|
| k | −9.754831E−01 | 0.000000E+00 |
| A4 | 2.496978E−01 | 1.153045E−01 |
| A6 | −5.549984E−02 | 1.239501E−02 |
| A8 | 9.408455E−03 | 1.009366E−02 |
| A10 | 4.118539E−04 | −3.172813E−03 |
| A12 | 0.000000E+00 | 1.537473E−03 |
| A14 | 0.000000E+00 | 0.000000E+00 |
| A16 | 0.000000E+00 | 0.000000E+00 |

The imaging lens in Example 3 satisfies conditional expressions (1) to (10) as shown in Table 9.

Figure 6:
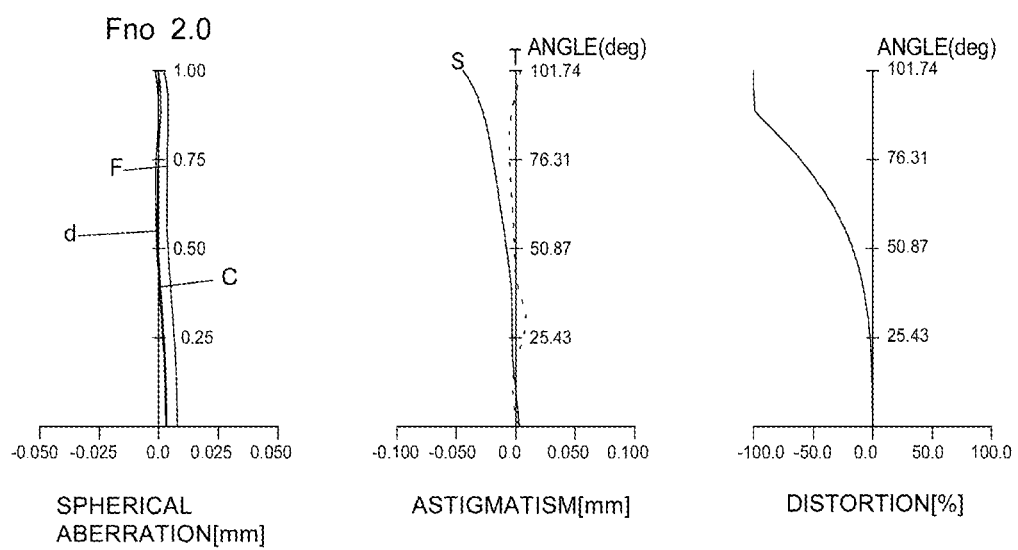
FIG. 6 shows spherical aberration, astigmatism, and distortion of the imaging lens in Example 3 according to the present invention.
Figure 7:
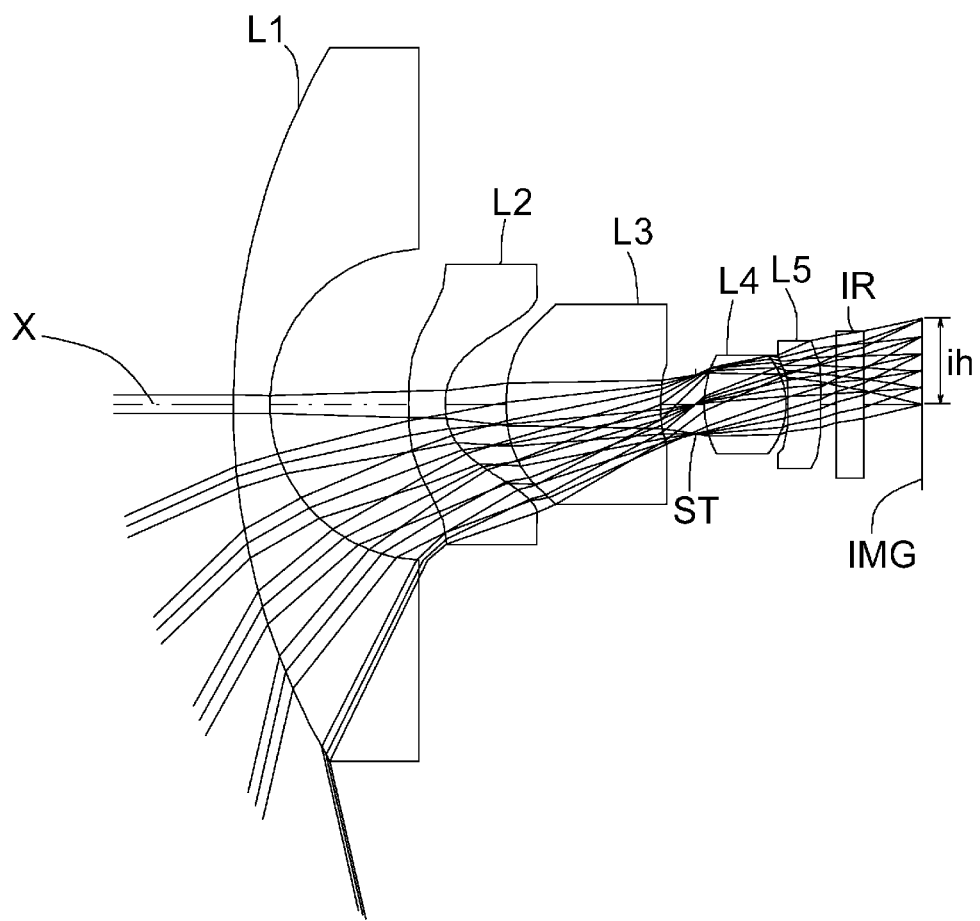
FIG. 7 is a schematic view showing the general configuration of an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example4

Unit mm f = 0.83
Fno = 2.0
ω(°) = 102.8
ih = 1.85
TTL = 14.79

Surface Data

| Surface Number i | Curvature Radius r | Surface Distance d | Refractive Index Nd | Abbe Number vd | |
|---|---|---|---|---|---|
| (Object) | Infinity | Infinity | | | |
| 1 | Infinity | Infinity | | | |
| 2 | 15.4821 | 0.8000 | 1.713 | 53.94 | (vd1) |
| 3 | 3.4000 | 3.0215 | | | |
| 4* | 28.0000 | 0.8000 | 1.544 | 55.86 | (vd2) |
| 5* | 1.8000 | 1.3245 | | | |
| 6* | 3.6914 | 3.3666 | 1.661 | 20.37 | (vd3) |
| 7* | 4.2162 | 0.7549 | | | |
| 8(Stop) | Infinity | 0.1960 | | | |
| 9 | 2.3199 | 1.7776 | 1.592 | 67.02 | (vd4) |
| 10 | −1.6684 | 0.0500 | | | |
| 11* | −32.4114 | 0.7089 | 1.661 | 20.37 | (vd5) |
| 12* | 59.2637 | 0.3344 | | | |
| 13 | Infinity | 0.6100 | 1.517 | 64.17 | |
| 14 | Infinity | 1.2557 | | | |
| Image Plane | Infinity | | | | |

Constituent Lens Data

| Lens | Start Surface | Focal Length | | Composite Focal Length |
|---|---|---|---|---|
| 1 | 2 | −6.284 | f12 | −1.688 |
| 2 | 4 | −3.573 | f23 | −3.829 |
| 3 | 6 | 12.635 | f34 | 2.996 |
| 4 | 9 | 1.965 | f45 | 2.043 |
| 5 | 11 | −31.613 | | |

Aspheric Surface Data

| | Fourth Surface | Fifth Surface | Sixth Surface | Seventh Surface | Eleventh Surface | Twelfth Surface |
|---|---|---|---|---|---|---|
| k | 0.000000E+00 | −5.930478E+00 | 0.000000E+00 | 0.000000E+00 | 0.000000E+00 | 0.000000E+00 |
| A4 | 6.963555E−02 | 2.143151E−01 | 1.402511E−02 | 6.401476E−02 | −4.886492E−02 | −1.157410E−03 |
| A6 | −1.786661E−02 | −4.634768E−02 | 4.707808E−03 | 1.720290E−02 | −1.271085E−01 | −7.647932E−02 |
| A8 | 2.547227E−03 | 2.714702E−03 | −1.626706E−03 | 1.227881E−02 | 1.097497E−01 | 5.229214E−02 |
| A10 | −2.437921E−04 | 0.000000E+00 | 3.854500E−04 | 0.000000E+00 | −7.293467E−02 | −2.306581E−02 |
| A12 | 1.420373E−05 | 0.000000E+00 | −4.943618E−05 | 0.000000E+00 | 0.000000E+00 | 3.999185E−03 |
| A14 | −3.787214E−07 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

The imaging lens in Example 4 satisfies conditional expressions (1) to (10) as shown in Table 9.

Figure 8:
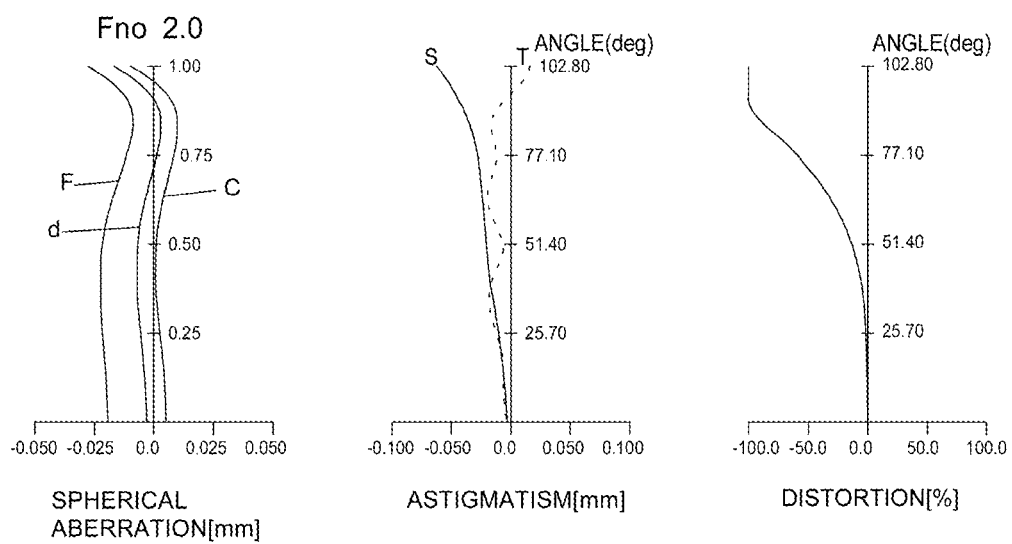
FIG. 8 shows spherical aberration, astigmatism, and distortion of the imaging lens in Example 4 according to the present invention.
Figure 9:
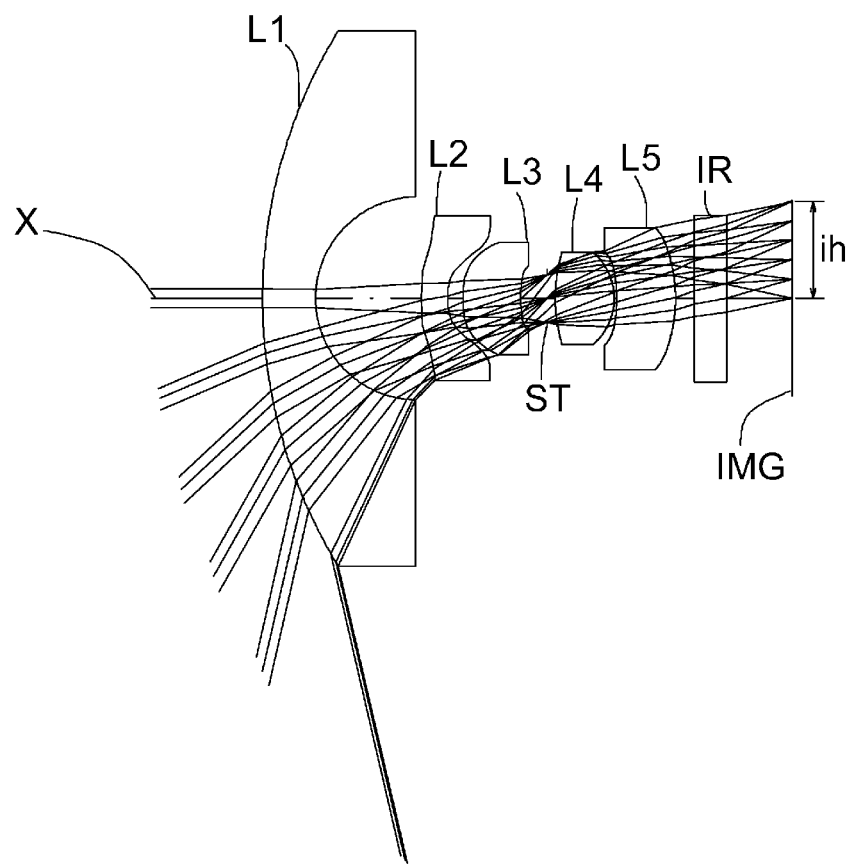
FIG. 9 is a schematic view showing a general configuration of an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example5

Unit mm f = 0.88
Fno = 2.4
ω(°) = 103.0
ih = 1.85
TTL = 9.84

Surface Data

| Surface Number i | Curvature Radius r | Surface Distance d | Refractive Index Nd | Abbe Number | vd |
|---|---|---|---|---|---|
| (Object) | Infinity | Infinity | | | |
| 1 | Infinity | Infinity | | | |
| 2 | 9.6741 | 1.0000 | 1.713 | 53.94 | ( vd1) |
| 3 | 1.9228 | 1.9925 | | | |
| 4* | 28.0000 | 0.5000 | 1.544 | 55.86 | ( vd2) |
| 5* | 1.8000 | 0.2912 | | | |
| 6* | 2.9850 | 1.0890 | 1.661 | 20.37 | ( vd3) |
| 7* | 3.0530 | 0.5003 | | | |
| 8(Stop) | Infinity | 0.1535 | | | |
| 9 | 3.0171 | 1.1116 | 1.592 | 67.02 | ( vd4) |
| 10 | −1.1592 | 0.0500 | | | |
| 11* | −3.0446 | 1.1119 | 1.661 | 20.37 | ( vd5) |
| 12* | −2.5584 | 0.3548 | | | |
| 13 | Infinity | 0.6100 | 1.517 | 64.17 | |
| 14 | Infinity | 1.2803 | | | |
| Image Plane | Infinity | | | | |

Constituent Lens Data

| Lens | Start Surface | Focal Length | | Composite Focal Length |
|---|---|---|---|---|
| 1 | 2 | −3.557 | f12 | −1.360 |
| 2 | 4 | −3.558 | f23 | −3.548 |
| 3 | 6 | 27.513 | f34 | 1.809 |
| 4 | 9 | 1.570 | f45 | 1.688 |
| 5 | 11 | 12.695 | | |

Aspheric Surface Data

| | Fourth Surface | Fifth Surface | Sixth Surface | Seventh Surface | Eleventh Surface | Twelfth Surface |
|---|---|---|---|---|---|---|
| k | 0.000000E+00 | −2.243925E+01 | 0.000000E+00 | 0.000000E+00 | 0.000000E+00 | 0.000000E+00 |
| A4 | 4.136079E−01 | 1.454265E+00 | 5.165533E−01 | 8.393213E−02 | −1.897453E−02 | 4.784294E−02 |
| A6 | −4.023346E−01 | −1.224022E+00 | −5.477710E−01 | 4.084672E+00 | −2.766763E−01 | −2.553767E−02 |
| A8 | 1.750323E−01 | 2.879950E−01 | 1.007595E+00 | −3.015946E+01 | 4.675315E−01 | 8.607773E−03 |
| A10 | −3.806626E−02 | 0.000000E+00 | −9.156868E−01 | 1.243420E+02 | −4.519773E−01 | −8.048505E−03 |
| A12 | 3.490999E−03 | 0.000000E+00 | 2.093492E−01 | −2.499109E+02 | 0.000000E+00 | 1.537473E−03 |
| A14 | −1.002125E−04 | 0.000000E+00 | 1.872117E−01 | 2.120258E+02 | 0.000000E+00 | 0.000000E+00 |
| A16 | 0.000000E+00 | 0.000000E+00 | −8.091073E−02 | 0.000000E+00 | 0.000000E+00 | 0.000000E+00 |

The imaging lens in Example 5 satisfies conditional expressions (1) to (10) as shown in Table 9.

Figure 10:
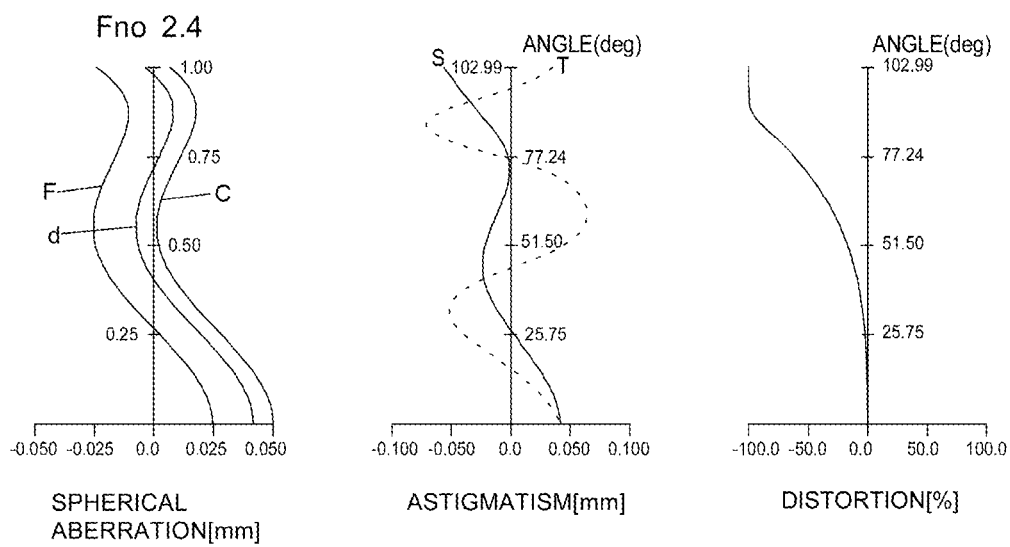
FIG. 10 shows spherical aberration, astigmatism, and distortion of the imaging lens in Example 5 according to the present invention.
Figure 11:
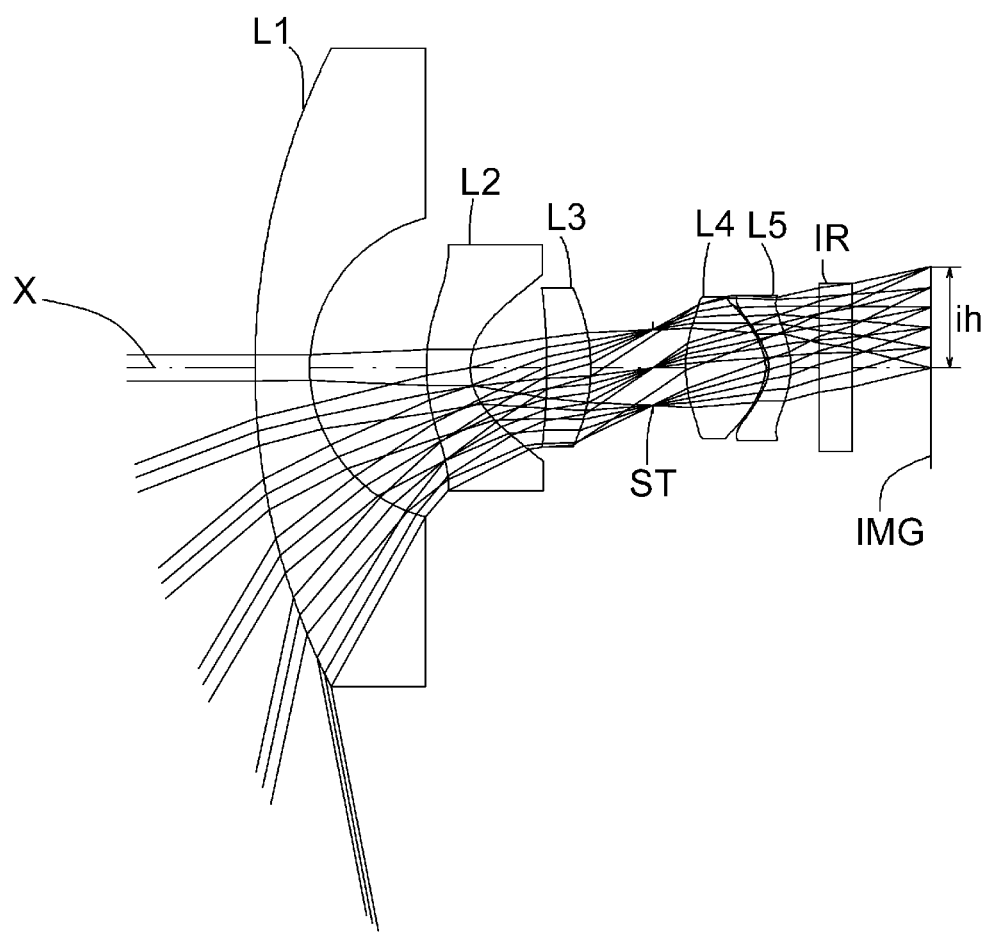
FIG. 11 is a schematic view showing the general configuration of an imaging lens in Example 6 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

Example6

Unit mm f = 1.00
Fno = 2.0
ω(°) = 100.9
ih = 1.85
TTL = 12.14

Surface Data

| Surface Number i | Curvature Radius r | Surface Distance d | Refractive Index Nd | Abbe Number | vd |
|---|---|---|---|---|---|
| (Object) | Infinity | Infinity | | | |
| 1 | Infinity | Infinity | | | |
| 2 | 12.9976 | 1.0000 | 1.713 | 53.94 | (vd1) |
| 3 | 2.8256 | 2.1338 | | | |
| 4* | 3.6033 | 0.8000 | 1.544 | 55.86 | (vd2) |
| 5* | 1.1297 | 1.4000 | | | |
| 6 | −11.4792 | 0.8000 | 1.821 | 24.06 | (vd3) |
| 7 | −3.3856 | 1.1256 | | | |
| 8(Stop) | Infinity | 0.6114 | | | |
| 9* | 2.4908 | 1.4606 | 1.544 | 55.86 | (vd4) |
| 10* | −0.7488 | 0.0581 | | | |
| 11* | −0.6604 | 0.4000 | 1.661 | 20.37 | (vd5) |
| 12* | −1.4414 | 0.5119 | | | |
| 13 | Infinity | 0.6100 | 1.517 | 64.17 | |
| 14 | Infinity | 1.4327 | | | |
| Image Plane | Infinity | | | | |

Constituent Lens Data

| Lens | Start Surface | Focal Length | | Composite Focal Length |
|---|---|---|---|---|
| 1 | 2 | −5.280 | f12 | −1.565 |
| 2 | 4 | −3.412 | f23 | −41.842 |
| 3 | 6 | 5.598 | f34 | 1.589 |
| 4 | 9 | 1.258 | f45 | 2.598 |
| 5 | 11 | −2.317 | | |

Aspheric Surface Data

| | Fourth Surface | Fifth Surface | Ninth Surface | Tenth Surface | Eleventh Surface | Twelfth Surface |
|---|---|---|---|---|---|---|
| k | 0.000000E+00 | −1.992806E+00 | 0.000000E+00 | −1.044869E+00 | −9.940344E−01 | −6.147027E−01 |
| A4 | 5.842853E−03 | 1.497577E−01 | −1.690291E−02 | 5.339427E−01 | 7.236983E−01 | 1.939836E−01 |
| A6 | −7.611378E−03 | −4.207712E−02 | 7.807804E−02 | −3.874266E−01 | −8.645318E−01 | −2.077559E−01 |
| A8 | 8.252052E−04 | −2.727858E−04 | −1.766850E−01 | −3.756587E−01 | 5.117689E−01 | 2.411006E−01 |
| A10 | −3.065910E−05 | 9.548386E−04 | 2.185477E−01 | 8.304656E−01 | −8.780983E−02 | −1.563092E−01 |
| A12 | 0.000000E+00 | 0.000000E+00 | −1.692386E−01 | −5.676829E−01 | −1.289375E−02 | 5.930061E−02 |
| A14 | 0.000000E+00 | 0.000000E+00 | 5.043862E−02 | 1.715039E−01 | 3.580490E−03 | −8.858233E−03 |
| A16 | 0.000000E+00 | 0.000000E+00 | 0.000000E+00 | −1.811591E−02 | 0.000000E+00 | 0.000000E+00 |

The imaging lens in Example 6 satisfies conditional expressions (1) to (10) as shown in Table9.

Figure 12:
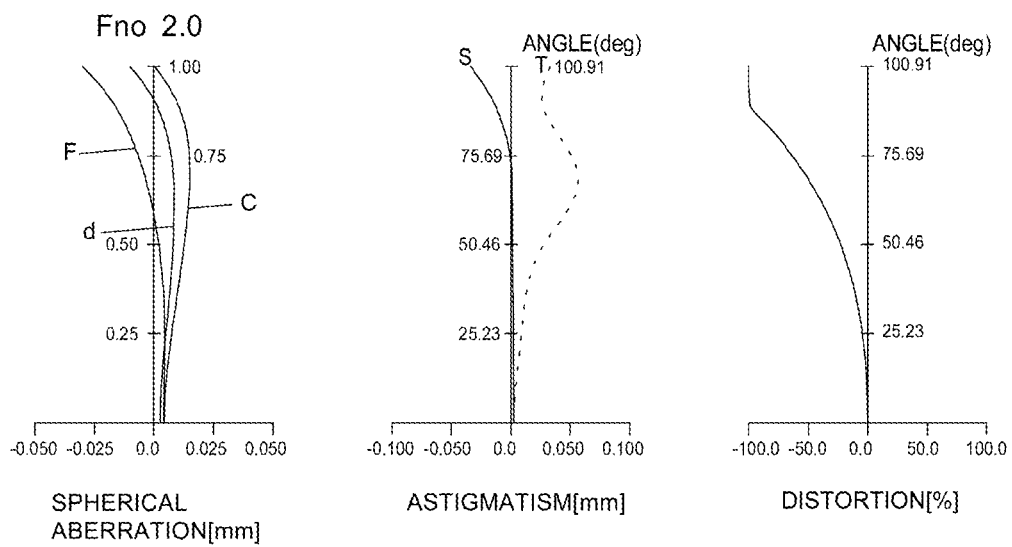
FIG. 12 shows spherical aberration, astigmatism, and distortion of the imaging lens in Example 6 according to the present invention.
Figure 13:
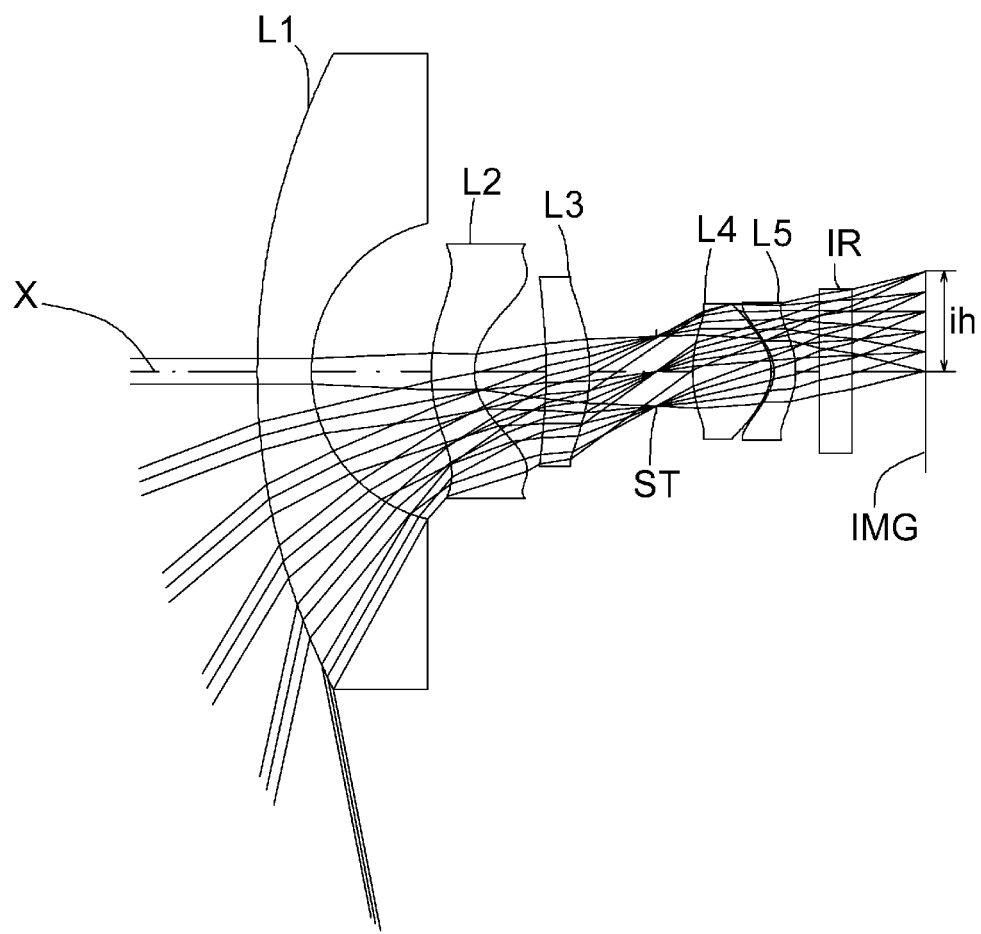
FIG. 13 is a schematic view showing the general configuration of an imaging lens in Example 7 according to the present invention.

FIG. 12 shows spherical aberration (mm), astigmatism (mm), and distortion (%) of the imaging lens in Example 6. As shown in FIG. 12, each aberration is corrected excellently.

Example 7

The basic lens data is shown below in Table 7.

TABLE 7

Example7

Unit mm f = 1.00
Fno = 2.0
ω(°) = 101.1
ih = 1.85
TTL = 12.13

Surface Data

| Surface Number i | Curvature Radius r | Surface Distance d | Refractive Index Nd | Abbe Number | vd |
|---|---|---|---|---|---|
| (Object) | Infinity | Infinity | | | |
| 1 | Infinity | Infinity | | | |
| 2 | 12.9882 | 1.0000 | 1.713 | 53.94 | ( vd1) |
| 3 | 2.8235 | 2.2109 | | | |
| 4* | 3.0637 | 0.8000 | 1.544 | 55.86 | ( vd2) |
| 5* | 1.1988 | 1.3276 | | | |
| 6* | −7.3199 | 0.8000 | 1.821 | 24.06 | ( vd3) |
| 7* | −3.0703 | 1.2280 | | | |
| 8(Stop) | Infinity | 0.6773 | | | |
| 9* | 2.4910 | 1.4501 | 1.544 | 55.86 | ( vd4) |
| 10* | −0.8062 | 0.0500 | | | |
| 11* | −0.7355 | 0.4000 | 1.661 | 20.37 | ( vd5) |
| 12* | −1.4915 | 0.4299 | | | |
| 13 | Infinity | 0.6100 | 1.517 | 64.17 | |
| 14 | Infinity | 1.3525 | | | |
| Image Plane | Infinity | | | | |

Constituent Lens Data

| Lens | Start Surface | Focal Length | | Composite Focal Length |
|---|---|---|---|---|
| 1 | 2 | −5.276 | f12 | −1.787 |
| 2 | 4 | −4.263 | f23 | −611.739 |
| 3 | 6 | 5.937 | f34 | 1.635 |
| 4 | 9 | 1.324 | f45 | 2.485 |
| 5 | 11 | −2.782 | | |

Aspheric Surface Data

| | Fourth Surface | Fifth Surface | Sixth Surface | Seventh Surface | Ninth Surface | Tenth Surface |
|---|---|---|---|---|---|---|
| k | 0.000000E+00 | −1.921853E+00 | 0.000000E+00 | 0.000000E+00 | 0.000000E+00 | −9.846783E−01 |
| A4 | 6.192286E−03 | 1.285674E−01 | 1.876056E−02 | 1.979390E−02 | −2.675256E−02 | 2.033247E−01 |
| A6 | −1.214209E−02 | −5.864266E−02 | −2.015024E−03 | −5.589227E−03 | 1.095062E−01 | −3.524377E−02 |
| A8 | 1.418989E−03 | 5.841420E−03 | −3.969148E−04 | 1.657509E−03 | −2.907705E−01 | −9.827388E−02 |
| A10 | −5.399502E−05 | 0.000000E+00 | 0.000000E+00 | 0.000000E+00 | 3.885304E−01 | 5.249235E−02 |
| A12 | 0.000000E+00 | 0.000000E+00 | 0.000000E+00 | 0.000000E+00 | −2.892146E−01 | 4.562422E−02 |
| A14 | 0.000000E+00 | 0.000000E+00 | 0.000000E+00 | 0.000000E+00 | 8.304341E−02 | −5.270045E−02 |
| A16 | 0.000000E+00 | 0.000000E+00 | 0.000000E+00 | 0.000000E+00 | 0.000000E+00 | 1.445242E−02 |

| | Eleventh Surface | Twelfth Surface |
|---|---|---|
| k | −9.507131E−01 | −5.349122E−01 |
| A4 | 2.656168E−01 | 9.762042E−02 |
| A6 | −9.713389E−02 | −2.498066E−02 |
| A8 | 4.875198E−02 | 6.027896E−02 |
| A10 | −3.502489E−02 | −3.937226E−02 |
| A12 | 3.347101E−02 | 1.510604E−02 |
| A14 | −9.378168E−03 | −1.821184E−03 |
| A16 | 0.000000E+00 | 0.000000E+00 |

The imaging lens in Example 7 satisfies conditional expressions (1) to (10) as shown in Table9.

Figure 14:
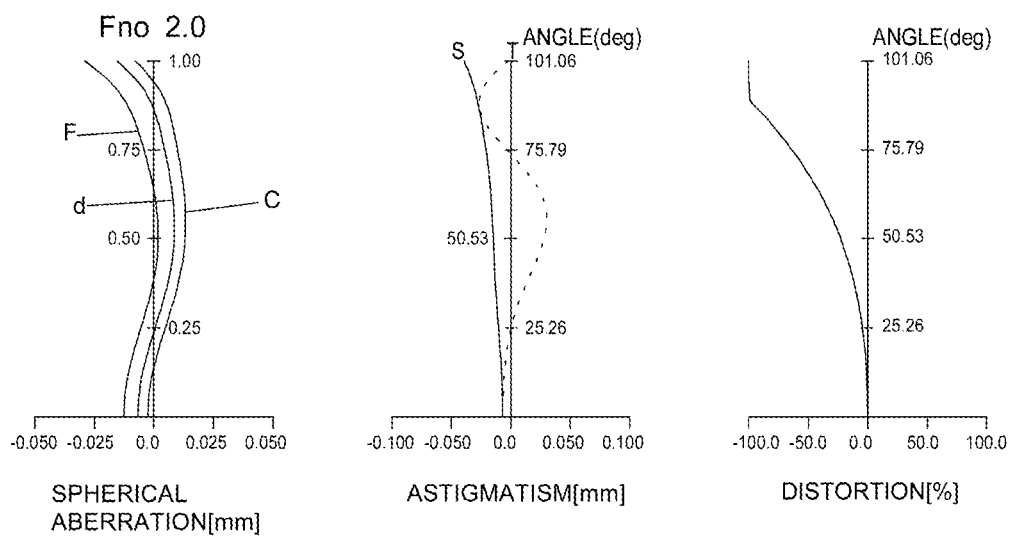
FIG. 14 shows spherical aberration, astigmatism, and distortion of the imaging lens in Example 7 according to the present invention.
Figure 15:
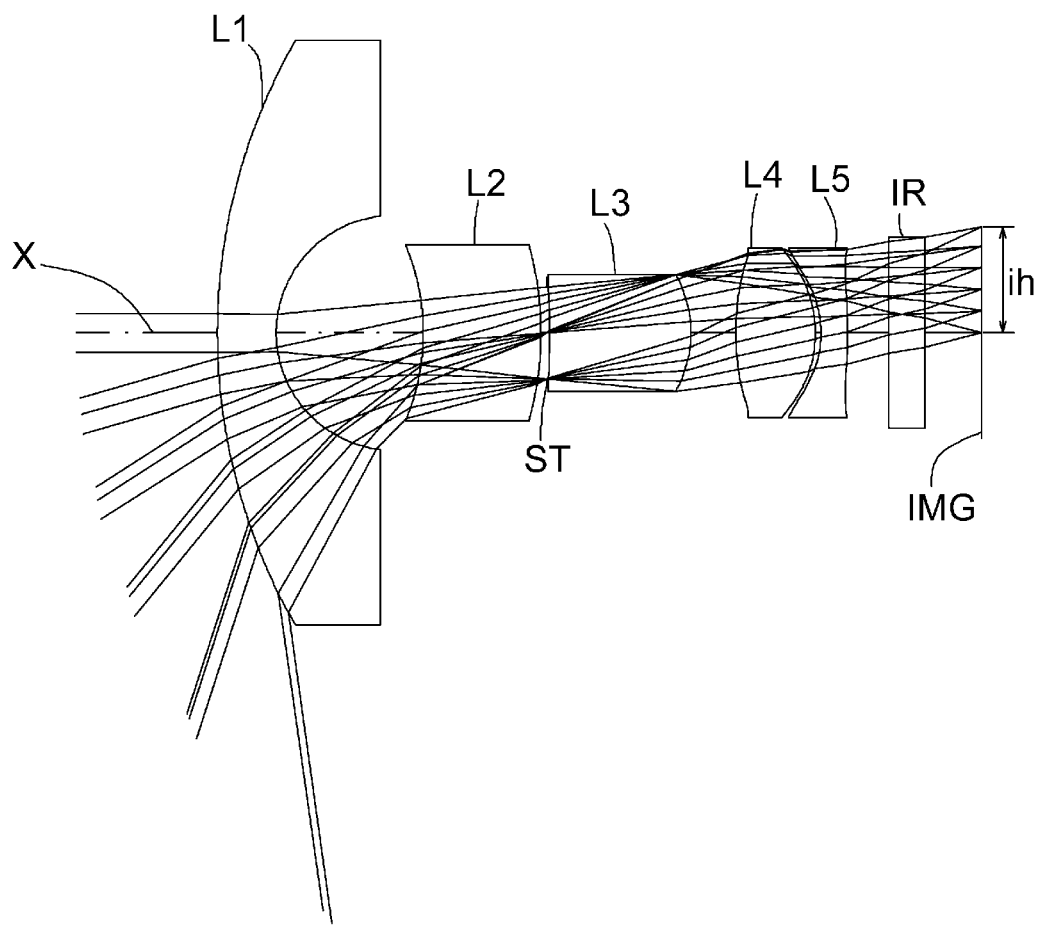
FIG. 15 is a schematic view showing the general configuration of an imaging lens in Example 8 according to the present invention.

FIG. 14 shows spherical aberration (mm), astigmatism (mm), and distortion (%) of the imaging lens in Example 7. As shown in FIG. 14, each aberration is corrected excellently.

Example 8

The basic lens data is shown below in Table 8.

TABLE 8

Example8

Unit mm f = 1.34
Fno = 2.0
ω(°) = 104.5
ih = 1.85
TTL = 12.78

Surface Data

| Surface Number i | Curvature Radius r | Surface Distance d | Refractive Index Nd | Abbe Number | vd |
|---|---|---|---|---|---|
| (Object) | Infinity | Infinity | | | |
| 1 | Infinity | Infinity | | | |
| 2 | 10.0000 | 1.0000 | 1.713 | 53.83 | ( vd1) |
| 3 | 2.0000 | 2.5000 | | | |
| 4 | −3.8402 | 2.0000 | 1.535 | 55.66 | ( vd2) |
| 5 | −5.5362 | 0.1000 | | | |
| 6(Stop) | Infinity | 0.0500 | | | |
| 7* | −21.6525 | 2.4000 | 1.535 | 55.66 | ( vd3) |
| 8* | −1.9052 | 0.7600 | | | |
| 9* | 4.7491 | 1.3500 | 1.592 | 67.02 | ( vd4) |
| 10* | −2.2231 | 0.1000 | | | |
| 11* | −1.7207 | 0.4500 | 1.650 | 21.54 | ( vd5) |
| 12* | −7.8154 | 0.7000 | | | |
| 13 | Infinity | 0.6100 | 1.517 | 64.17 | |
| 14 | Infinity | 0.9630 | | | |
| Image Plane | Infinity | | | | |

Constituent Lens Data

| Lens | Start Surface | Focal Length | | Composite Focal Length |
|---|---|---|---|---|
| 1 | 2 | −3.699 | f12 | −3.605 |
| 2 | 4 | −39.789 | f23 | 3.309 |
| 3 | 7 | 3.747 | f34 | 1.961 |
| 4 | 9 | 2.756 | f45 | 9.171 |
| 5 | 11 | −3.494 | | |

Aspheric Surface Data

| | Seventh Surface | Eighth Surface | Ninth Surface | Tenth Surface | Eleventh Surface | Twelfth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −2.623419E−02 | 2.761111E−02 | 1.939948E−02 | −2.869968E−02 | −8.014200E−04 | 1.641104E−02 |
| A6 | −7.465354E−03 | −7.990119E−03 | −2.782302E−03 | 5.497931E−03 | 1.757067E−02 | 6.856188E−03 |
| A8 | −4.295138E−03 | 2.679989E−03 | −3.753047E−03 | 3.626174E−03 | 2.555000E−03 | −3.633142E−04 |
| A10 | −1.861916E−02 | −1.555409E−03 | 7.436112E−04 | −1.936640E−04 | 1.216748E−03 | −3.983107E−04 |
| A12 | 2.447187E−02 | 1.392587E−03 | −2.094774E−04 | −4.715342E−05 | 5.703315E−06 | 1.743562E−04 |
| A14 | 4.951589E−02 | 1.333572E−03 | −6.616150E−05 | −4.402712E−05 | −9.274663E−05 | 1.152112E−04 |
| A16 | −1.450455E−02 | −2.169323E−04 | 3.155897E−05 | −7.356031E−06 | −1.515301E−05 | −6.017864E−05 |

The imaging lens in Example 8 satisfies conditional expressions (1) to (10) as shown in Table 9.

Figure 16:
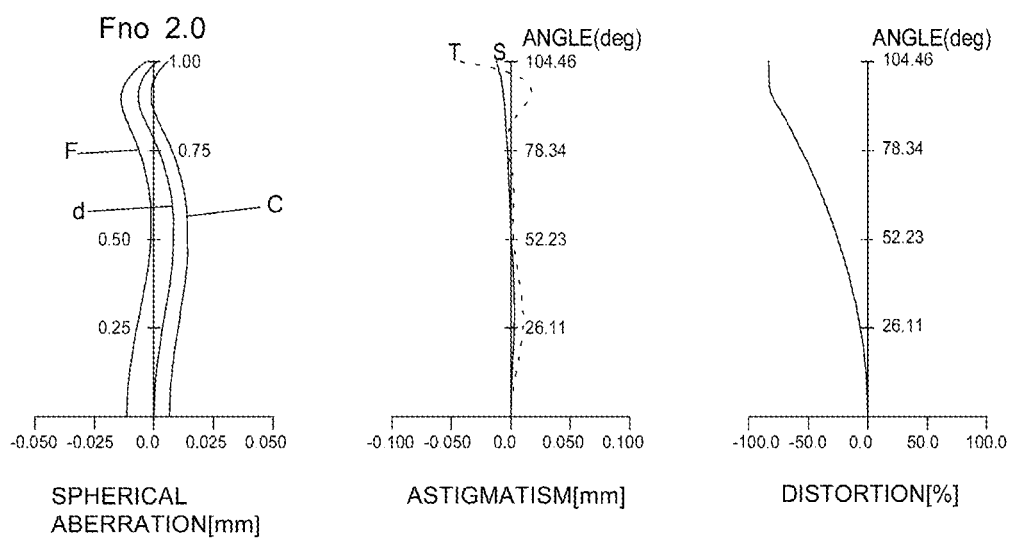
FIG. 16 shows spherical aberration, astigmatism, and distortion of the imaging lens in Example 8 according to the present invention.

FIG. 16 shows spherical aberration (mm), astigmatism (mm), and distortion (%) of the imaging lens in Example 8. As shown in FIG. 16, each aberration is corrected excellently.

In table 9, values of conditional expressions (1) to (10) related to the Examples 1 to 8 are shown.

TABLE 9

| | Conditional Expression | Example 1 | Example 2 | Example 3 | Example 4 | Example 5 | Example 6 | Example 7 | Example 8 |
|---|---|---|---|---|---|---|---|---|---|
| (1) | r5/r6 | 0.63 | 2.71 | 1.67 | 0.88 | 0.98 | 3.39 | 2.38 | 11.36 |
| (2) | f2/f | −3.91 | −4.27 | −4.64 | −4.30 | −4.04 | −3.41 | −4.26 | −29.71 |
| (3) | f1/f | −6.12 | −7.41 | −6.34 | −7.56 | −4.04 | −5.28 | −5.27 | −2.76 |
| (4) | r1/r2 | 3.83 | 4.03 | 4.44 | 4.55 | 5.03 | 4.60 | 4.60 | 5.00 |
| (5) | f12/f | −1.78 | −2.17 | −2.14 | −2.03 | −1.54 | −1.57 | −1.79 | −2.69 |
| (6) | r7/r8 | −1.19 | −3.16 | −3.07 | −1.39 | −2.60 | −3.33 | −3.09 | −2.14 |
| (7) | f4/f | 2.20 | 1.42 | 1.52 | 2.36 | 1.78 | 1.26 | 1.32 | 2.06 |
| (8) | (r9 + r10)/(r9 − r10) | 2.51 | −2.61 | −2.83 | −0.29 | 11.52 | −2.69 | −2.95 | −1.56 |

TABLE 9-continued

| Conditional Expression | Example 1 | Example 2 | Example 3 | Example 4 | Example 5 | Example 6 | Example 7 | Example 8 |
|---|---|---|---|---|---|---|---|---|
| (9) vd4-vd5 | 46.64 | 35.09 | 46.66 | 46.66 | 46.66 | 35.50 | 35.50 | 45.49 |
| (10) Fno | 2.0 | 2.0 | 2.0 | 2.0 | 2.4 | 2.0 | 2.0 | 2.0 |

When the imaging lens according to the present invention is adopted to an imaging device mounted in a mobile terminal device, a monitoring camera and an automobile, there is realized contribution to low-profileness and wide field of view of the camera, and low F-number, and also high performance thereof.

DESCRIPTION OF REFERENCE NUMERALS

ST: an aperture stop,
L1: first lens,
L2: second lens,
L3: third lens,
L4: fourth lens,
L5: fifth lens,
ih: maximum image height,
IR: filter,
IMG: imaging plane

What is claimed is:

1. An imaging lens comprising in order from an object side to an image side,
   a first lens having a convex surface facing the object side near an optical axis and negative refractive power,
   a second lens having negative refractive power,
   a third lens,
   a fourth lens having biconvex shape near the optical axis, and
   a fifth lens having negative refractive power,
   wherein each lens of said first lens to said fifth lens is arranged without being cemented, and below conditional expressions (1), (2), (3), and (8) are satisfied:

$0.50 < r5/r6 < 12.50$ (1)

$-35.50 \leq f2/f < -2.75$ (2)

$-9.00 \leq f1/k < -2.20$ (3)

$-3.50 < (r9+r10)/(r9-r10) < 13.85$ (8)

where
   r5: curvature radius of the object-side surface of the third lens,
   r6: curvature radius of the image-side surface of the third lens,
   f2: focal length of the second lens,
   f: focal length of the overall optical system,
   f1: focal length of the first lens,
   r9: curvature radius of the object-side surface of the fifth lens, and
   r10: curvature radius of the image-side surface of the fifth lens.

2. The imaging lens according to claim 1, wherein a below conditional expression (4) is satisfied:

$3.00 < r1/r2 < 6.10$ (4)

where
   r1: curvature radius of the object-side surface of the first lens, and
   r2: curvature radius of the image-side surface of the first lens.

3. The imaging lens according to claim 1, wherein composite focal length of said first lens and said second lens is negative, and a below conditional expression (5) is satisfied:

$-3.20 < f12/k < -1.25$ (5)

where
   f12: composite focal length of the first lens and the second lens, and
   f: focal length of the overall optical system.

4. The imaging lens according to claim 1, wherein a below conditional expression (6) is satisfied:

$-3.90 < r7/r8 < -0.95$ (6)

where
   r7: curvature radius of the object-side surface of the fourth lens, and
   r8: curvature radius of the image-side surface of the fourth lens.

5. The imaging lens according to claim 1, wherein a below conditional expression (7) is satisfied:

$1.00 < f4/f < 2.85$ (7)

where
   f4: focal length of the fourth lens, and
   f: focal length of the overall optical system.

6. The imaging lens according to claim 1, wherein a below conditional expression (9) is satisfied:

$28.00 < vd4-vd5 < 56.00$ (9)

where
   vd4: abbe number at d-ray of the fourth lens, and
   vd5: abbe number at d-ray of the fifth lens.

7. The imaging lens according to claim 1, wherein a below conditional expression (10) is satisfied:

$Fno \leq 2.4$ (10)

where
   Fno: F-number.

8. An imaging lens comprising in order from an object side to an image side,
   a first lens having a convex surface facing the object side near an optical axis and negative refractive power,
   a second lens having negative refractive power,
   a third lens having a concave surface facing the image side near the optical axis and a meniscus shape,
   a fourth lens having biconvex shape near the optical axis, and
   a fifth lens having negative refractive power,
   wherein each lens of said first lens to said fifth lens is arranged without being cemented, and below conditional expressions (1) and (3) is satisfied:

$0.50 < r5/r6 < 12.50$ (1)

$-9.00 \leq f1/k < -2.20$ (3)

where
   r5: curvature radius of the object-side surface of the third lens,
   r6: curvature radius of the image-side surface of the third lens,
   f1: focal length of the first lens, and
   f: focal length of the overall optical system.

9. The imaging lens according to claim 8, wherein composite focal length of said first lens and said second lens is negative, and below conditional expression (5) is satisfied:

$$-3.20<f12/k<-1.25 \tag{5}$$

where
f12: composite focal length of the first lens and the second lens, and
f: focal length of the overall optical system.

10. The imaging lens according to claim 8, wherein a below conditional expression (6) is satisfied:

$$-3.90<r7/r8<-0.95 \tag{6}$$

where
r7: curvature radius of the object-side surface of the fourth lens, and
r8: curvature radius of the image-side surface of the fourth lens.

11. The imaging lens according to claim 8, wherein a below conditional expression (7) is satisfied:

$$1.00<f4/f<2.85 \tag{7}$$

where
f4: focal length of the fourth lens, and
f: focal length of the overall optical system.

12. The imaging lens according to claim 8, wherein a below conditional expression (9) is satisfied:

$$28.00<vd4-vd5<56.00 \tag{9}$$

where
vd4: abbe number at d-ray of the fourth lens, and
vd5: abbe number at d-ray of the fifth lens.

13. The imaging lens according to claim 1, wherein a below conditional expression (10) is satisfied:

$$Fno \leq 2.4 \tag{10}$$

where
Fno: F-number.

14. An imaging lens comprising in order from an object side to an image side,
a first lens having a convex surface facing the object side near an optical axis and negative refractive power,
a second lens having negative refractive power,
a third lens,
a fourth lens having biconvex shape near the optical axis, and
a fifth lens having a concave surface facing the object side near the optical axis and positive refractive power,
wherein a below conditional expression (1) is satisfied:

$$0.50<r5/r6<12.50 \tag{1}$$

where
r5: curvature radius of the object-side surface of the third lens, and
r6: curvature radius of the image-side surface of the third lens.

15. The imaging lens according to claim 14, wherein each lens from said first lens to said fifth lens is arranged without being cemented.

16. The imaging lens according to claim 1, wherein a below conditional expression (10) is satisfied:

$$Fno \leq 2.4 \tag{10}$$

where Fno: F-number.

* * * * *